No. 728,806. Patented May 19, 1903.

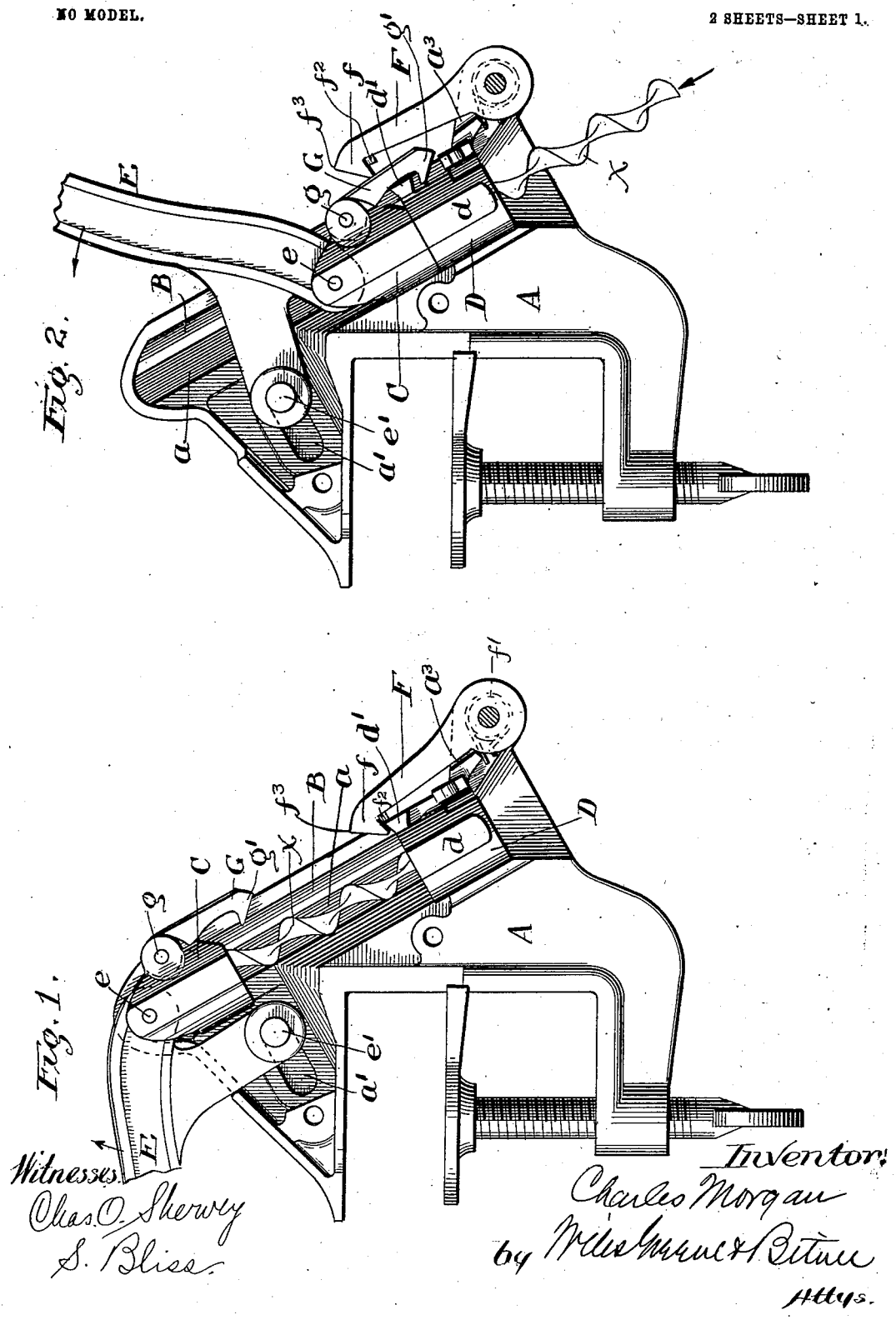

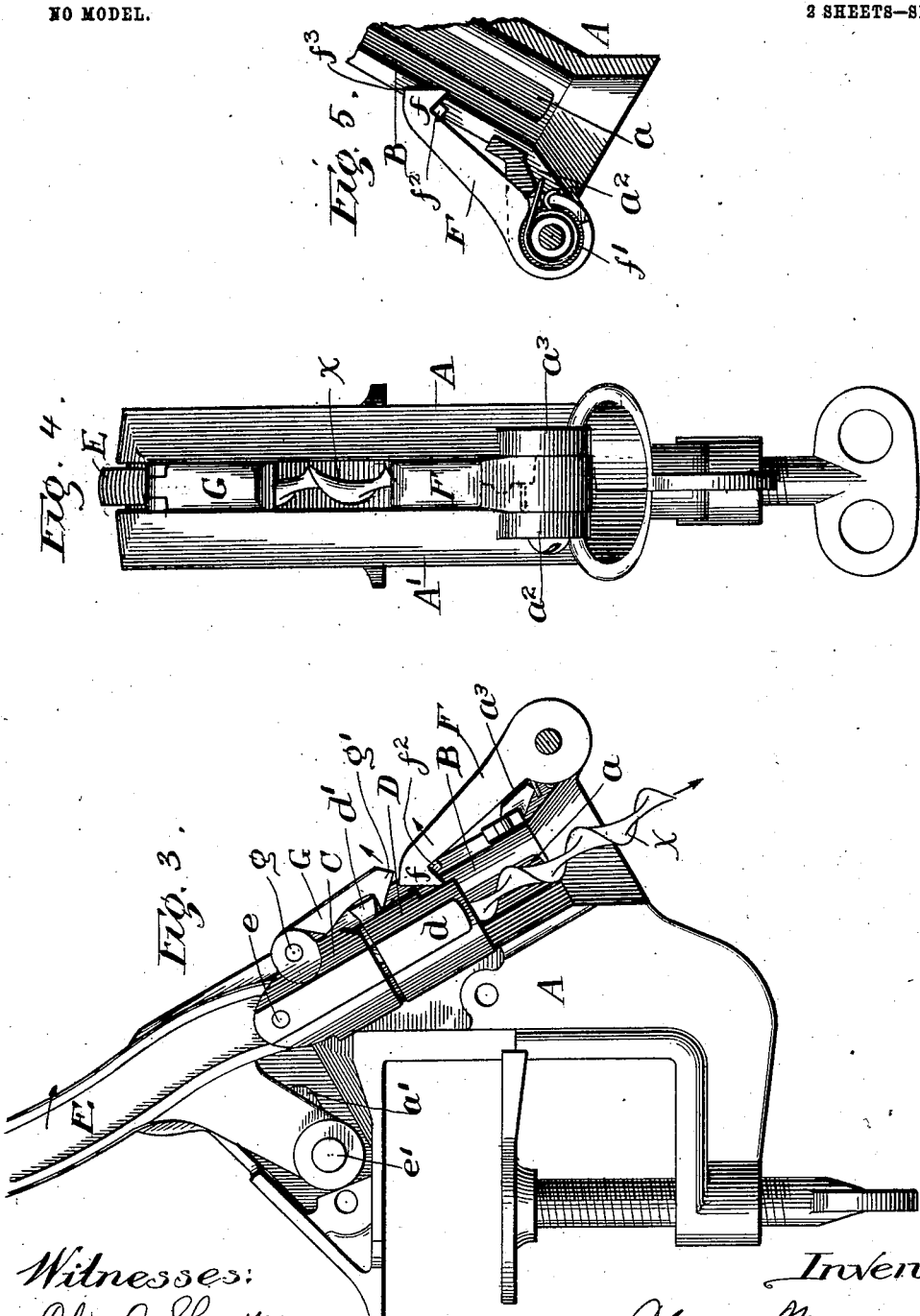

UNITED STATES PATENT OFFICE.

CHARLES MORGAN, OF FREEPORT, ILLINOIS, ASSIGNOR TO ARCADE MANUFACTURING CO., OF FREEPORT, ILLINOIS, A CORPORATION OF ILLINOIS.

CORK-PULLER.

SPECIFICATION forming part of Letters Patent No. 728,806, dated May 19, 1903.

Application filed August 15, 1901. Serial No. 72,107. (No model.)

*To all whom it may concern:*

Be it known that I, CHARLES MORGAN, a citizen of the United States of America, residing at Freeport, in the county of Stephenson and State of Illinois, have invented certain new and useful Improvements in Cork-Pullers, of which the following is a specification.

My invention relates to certain improvements in cork-pullers designed to produce a simple, cheap, and efficient puller adapted to perform all the desirable operations of a device of this class with a minimum number of parts and with absolute certainty and effectiveness.

To such end the invention consists in certain novel characteristics, which will be set forth in connection with their preferred embodiment in the description and clearly defined in the claims.

In the drawings illustrating the invention, Figure 1 is a side elevation of a puller with one of the side plates removed to show the inner parts. Fig. 2 is a similar view showing said parts just after the corkscrew has entered the cork. Fig. 3 is a similar view showing the parts in their downward movement prior to the locking of the nut to the frame. Fig. 4 is a front elevation, and Fig. 5 is a sectional view showing the spring applied to the nut-locking dog.

A is the main frame, and A' the front plate thereof, the two forming a casing within which the working parts are contained. In this casing is an oblique channel B, in which are longitudinally guided a corkscrew-carrier C and a nut D, the latter being guided against rotation by means of side lugs $d$, running in grooves $a$ of the frame. A corkscrew X is rotatably secured at one end in the carrier and is threaded in the nut, so as to be rotated by longitudinal movement of the carrier relative to the nut. An operating-handle E is pivoted to the carrier at $e$ and has gudgeons $e'$, guided in grooves $a'$ in the frame, permitting the necessary forward and backward movements of the handle-pivot to enable the corkscrew-carrier to follow its guides in the case. On the lower front portion of the case are two lugs $a^2$ $a^3$, and between them is pivoted a nut-holding dog F, the hooked upper end of which, $f$, engages a lug $d'$ upon the nut. A coiled spring $f'$ tends to hold the dog toward the frame. A lug $f^2$ on the dog rests upon the lug $d'$ of the nut when the latter is in this part of the case. When the nut is in the upper part of the case, a slight further inward movement of the dog is permitted before it comes in contact with the case itself, as is seen in Fig. 5.

A gravity-latch G is pivoted at $g$ to the carrier and tends to engage the lug $d'$ upon the nut. It has a pointed lower end $g'$, however, and the dog F has a pointed upper end $f^3$, said points being so arranged that the latch will pass beneath the dog when the latter rests on the nut, but will pass over the dog when the latter is at its inner limit of movement, as is seen in Figs. 3 and 5. This arrangement of the nut-locking dog and the latch causes the latch to automatically lift the dog from the nut and drop into engagement with said nut and lock it to the carrier whenever the carrier is brought down toward the nut and causes the dog to automatically lift the latch from the nut and thereafter itself engage the nut whenever the nut and carrier are brought down together. In operation, therefore, the nut will be locked to the carrier during each alternate backward and forward movement of the handle and to the case during the intermediate backward and forward movements of the same.

In use the normal position of the puller is seen in Fig. 1. The bottle is to be placed in the flaring mouth of the frame below the nut, and the first forward movement of the handle forces the corkscrew into the cork, releases the nut from the frame, and locks the nut to the carrier. (See Fig. 2.) The backward movement withdraws the cork from the bottle, raising it and the nut upward with the carrier. The next forward movement lowers the nut and cork, releases the nut from the carrier, Fig. 3, and locks the nut to the case, and the next backward movement withdraws the corkscrew from the cork.

The exact details of construction are immaterial to the broad features of the invention, and for that reason I do not limit myself thereto.

I claim as new and desire to secure by Letters Patent—

1. In a cork-extractor, the combination with a suitable frame, a corkscrew and corkscrew-carrier reciprocating longitudinally therein and a reciprocable non-rotating nut embracing the corkscrew, of an oscillating lever adapted at each oscillation in one direction to force the corkscrew downward and at each oscillation in the opposite direction to raise the corkscrew, a device actuated by the operating-handle connecting the nut and carrier to move together during the alternate movements of the handle, in a given direction, and means for disconnecting the nut and carrier during the intermediate movements of the lever in a given direction, substantially as described.

2. In a cork-puller, the combination with a suitable frame, a corkscrew-carrier, a corkscrew, and a non-rotating nut longitudinally guided therein, of an oscillating lever operating at each movement in a given direction to force the corkscrew downward and at each movement in the opposite direction to draw the corkscrew upward, means operated by the corkscrew-operating lever for locking the nut to the carrier during each alternate movement of said lever in a given direction, and coacting means operating to disengage the nut from the carrier and lock it to the case during the intermediate movements of the lever in said direction, substantially as described.

3. In a cork-puller, the combination with a suitable frame, a corkscrew-carrier, corkscrew, and non-rotatable nut longitudinally guided therein, of an oscillating lever driving the corkscrew downward at each movement in one direction and raising the corkscrew at each movement in the opposite direction, a device for connecting the nut with the carrier and a device for locking the nut to the frame, the connecting device operating automatically to unlock the locking device from the nut and the locking device operating automatically to disconnect the connecting device between the nut and the carrier; substantially as described.

4. In a cork-puller, the combination with a suitable frame and longitudinally-guided corkscrew-carrier, corkscrew and non-rotating nut therein, of means for reciprocating the carrier in the frame, a pawl connected to and moving with the carrier and adapted to engage the nut to lock the nut and carrier together and a pawl connected to the case adapted to engage the nut and lock the nut to the case, the pawl on the carrier operating to disengage the pawl on the case from the nut; substantially as described.

5. In a cork-puller, the combination with a suitable frame and longitudinally-guided corkscrew-carrier, corkscrew and non-rotating nut therein, of means for reciprocating the carrier in the case, a pawl connected to move with the carrier and adapted to engage the nut to lock the nut and carrier together and a pawl connected to the case adapted to engage the nut and lock the nut to the case, the pawl on the carrier operating to disengage the pawl on the case from the nut, and the pawl on the case operating to disengage the pawl on the carrier from the nut; substantially as described.

6. In a cork-puller, the combination with a suitable frame, of a longitudinally-guided corkscrew-carrier and corkscrew, a non-rotatable nut therein, means for reciprocating the corkscrew-carrier, a nut-engaging pawl on the carrier and moving therewith and adapted to automatically engage the nut when it approaches the same and a nut-locking pawl secured to the case adapted to automatically engage the nut when the latter comes within range, the carrier-pawl operating to disengage the nut-locking pawl from the nut when said latter pawl is in engagement therewith and the nut-locking pawl operating in turn to disengage the carrier-pawl from the nut when said carrier-pawl is in engagement with said nut; substantially as described.

7. In a cork-puller, the combination with a suitable frame, a longitudinally-guided corkscrew-carrier, a corkscrew and a non-rotatable nut, of means for reciprocating the carrier, nut-engaging pawls upon the carrier and frame respectively, each operating alternately with the other to disengage the other from the nut and to effect engagement therewith; substantially as described.

8. In a cork-puller, the combination with a suitable frame, a corkscrew-carrier, corkscrew and non-rotatable nut longitudinally guided therein, of an oscillating lever adapted to alternately drive the corkscrew downward and raise the same, a device for connecting the nut with the carrier and a device for locking the nut to the frame, the connecting device operating automatically to unlock the locking device from the nut and the locking device operating automatically to disengage the connecting device between the nut and the carrier, substantially as described.

9. The combination with a cork-puller frame, of a corkscrew-carrier and non-rotatable nut obliquely guided in the frame, a corkscrew mounted in the carrier and threaded in the nut, a gravity-hook pivoted to the carrier and adapted to engage the nut to lock the two together and a device for locking the nut to the frame, arranged, when locked, in the path of the gravity-hook and adapted to guide said hook away from engagement with the nut, substantially as described.

In witness whereof I have hereunto set my hand, at Freeport, in the county of Stephenson and State of Illinois, this 18th day of July, A. D. 1901.

CHARLES MORGAN.

Witnesses:
T. E. BOEDEKER,
BERT HERBIG.